(12) United States Patent
Lu et al.

(10) Patent No.: US 8,340,007 B2
(45) Date of Patent: Dec. 25, 2012

(54) WIRELESS DEVICE, PAIRING METHOD, AND UNPAIRING METHOD

(75) Inventors: Chi-Ming Lu, Taipei Hsien (TW); Guo-Zhi Ding, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 916 days.

(21) Appl. No.: 12/429,159

(22) Filed: Apr. 23, 2009

(65) Prior Publication Data
US 2010/0029205 A1  Feb. 4, 2010

(30) Foreign Application Priority Data
Jul. 31, 2008  (CN) .......................... 2008 1 0303247

(51) Int. Cl.
*H04W 4/00* (2009.01)
*H04B 7/00* (2006.01)

(52) U.S. Cl. ....... 370/310; 370/338; 370/401; 455/41.2; 455/435.1; 455/519

(58) Field of Classification Search .................. 370/310, 370/338, 401; 455/41.2, 435.1, 519
See application file for complete search history.

(56) References Cited

U.S. PATENT DOCUMENTS

| | | | | |
|---|---|---|---|---|
| 6,054,950 A | * | 4/2000 | Fontana | 342/463 |
| 7,245,915 B2 | * | 7/2007 | Matta et al. | 455/436 |
| 7,352,793 B2 | * | 4/2008 | Welborn et al. | 375/130 |
| 7,436,850 B2 | * | 10/2008 | Mowery et al. | 370/466 |
| 7,570,627 B2 | * | 8/2009 | Welborn et al. | 370/345 |
| 7,580,380 B2 | * | 8/2009 | Baker et al. | 370/310 |
| 7,738,569 B2 | * | 6/2010 | Quinn et al. | 375/259 |
| 2006/0256736 A1 | * | 11/2006 | Koehler et al. | 370/254 |
| 2007/0092046 A1 | * | 4/2007 | Lee | 375/346 |
| 2008/0101363 A1 | * | 5/2008 | Li | 370/390 |
| 2009/0198859 A1 | * | 8/2009 | Orishko et al. | 710/313 |

* cited by examiner

*Primary Examiner* — Alpus H Hsu

(74) *Attorney, Agent, or Firm* — Altis Law Group, Inc.

(57) ABSTRACT

A wireless device triggers pairing or un-pairing between the wireless device and another wireless device. The wireless device further exchanges media access control (MAC) addresses, pairing magic numbers (PMNs), and pairing indices with the another wireless device so as to establish the pairing with the another wireless device upon the condition that the wireless device triggers the pairing. The wireless device further exchanges the MAC addresses, the PMNs, and the pairing indices with the another wireless device so as to establish the unpairing with the another wireless device upon the condition that the wireless device triggers the unpairing. The pairing magic numbers are operable to identify the pairing between the wireless device and the another wireless device. The pairing indices are operable to launch the MAC addresses, the PMNs, and the pairing indices.

20 Claims, 10 Drawing Sheets

| Header Field | Value |
|---|---|
| Protocol version | 0 |
| Secure | 0 for non-security, 1 for security |
| ACK policy | 0 for No-ACK, 1 for ACK |
| Frame type | 2 (command frame) |
| Frame subtype | 14 |
| Retry | 0 |
| Destination address | Address of a recipient |
| Source address | Address of a transmitter |
| Sequence control | |
| Duration | |
| More frames | 0 |
| Access method | 1 |

100

101 Protocol version
102 Secure
103 ACK policy
104 Frame type
105 Frame subtype
106 Retry
107 Destination address
108 Source address
109 Sequence control
110 Duration
111 More frames
112 Access method

WIRELESS DEVICE, PAIRING METHOD, AND UNPAIRING METHOD

BACKGROUND

1. Technical Field

Embodiments of the present disclosure relate to wireless communications, and particularly to a wireless device, a pairing method, and an unpairing method.

2. Description of Related Art

For security reasons, two ultra-wide-band (UWB) devices are paired together before transmitting traffic. In order to avoid interferences from other UWB devices, the two UWB devices are connected by a coaxial cable, and then powered on. By listening in beacons of each other, the two UWB devices can establish pairing therebetween.

However, this method requires an extra coaxial cable to be provided and deployed, which is costly and inconvenient.

BRIEF DESCRIPTION OF THE DRAWINGS

Many aspects of the embodiments can be better understood with references to the following drawings.

FIG. 2 is a schematic diagram of a MAC header of a command frame in accordance with one embodiment of the present disclosure;

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
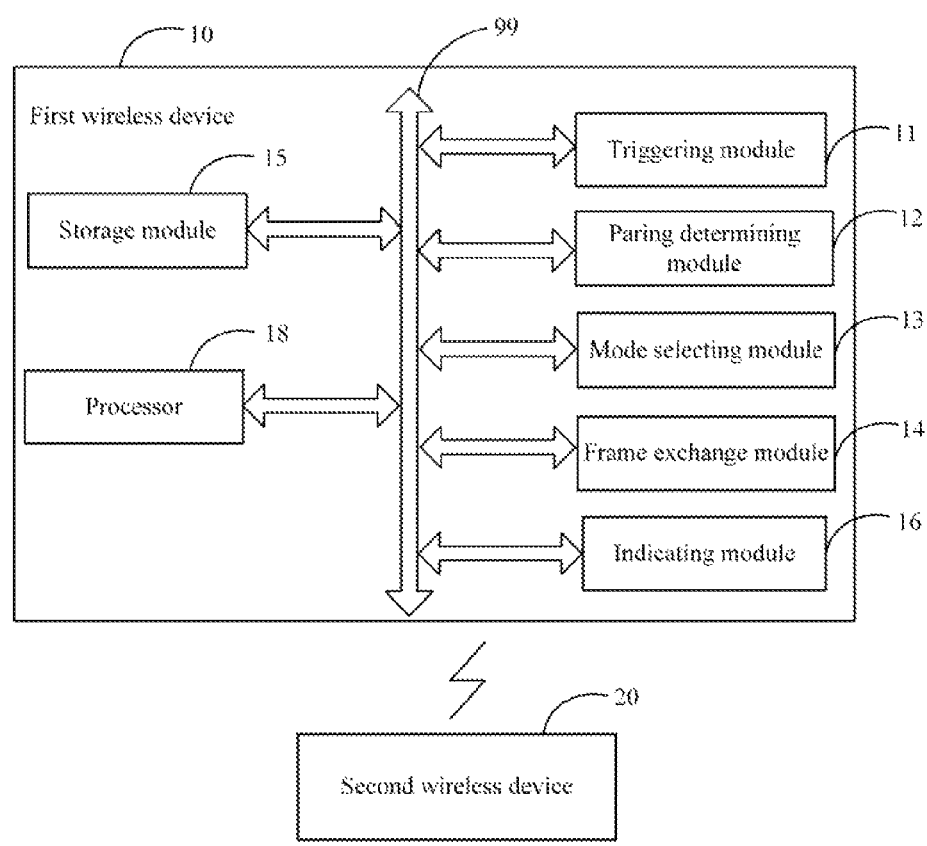
FIG. 1 is a schematic diagram of an application environment and functional modules of one embodiment of a wireless device in accordance with the present disclosure.

FIG. 1 is a schematic diagram of an application environment and functional modules of one embodiment of a first wireless device 10 in accordance with the present disclosure. In one embodiment, the first wireless device 10 communicates with a second wireless device 20. The first wireless device 10 and the second wireless device 20 may be ultra-wide-band (UWB) devices that support peer to peer transmission, such as UWB television (TV) transceivers. The first wireless device 10 and the second wireless device 20 can exchange pairing information to establish wireless pairing/unpairing between each other.

The pairing information includes media access control (MAC) addresses, pairing magic number (PMNs), and pairing indices of the first wireless device 10 and the second wireless device 20. The PMNs are random numbers generated based on a system time, and is operable to identify the pairing between the first wireless device 10 and the second wireless device 20 so as to avoid interferences from other pairings between other devices. The pairing indices are operable to launch the pairing information during the unpairing between the first wireless device 10 and the second wireless device 20, which improves a speed of the unpairing. The pairing indices may be further operable to avoid other devices faking the pairing information so as to assure communication security.

The PMNs may be further operable to determine whether the pairing information has expired. For example, if the pairing information is deemed to have expired if the PMNs have expired, then accordingly, the first wireless device 10 and the second wireless device 20 will cancel the pairing information to establish the unpairing between the first wireless device 10 and the second wireless device 20.

In one embodiment, the first wireless device 10 includes a triggering module 11, a frame exchange module 14, and a processor 18. The processor 18 executes computerized commands of the triggering module 11 and the frame exchange module 14. The triggering module 11 is operable to trigger the pairing or the unpairing between the first wireless device 10 and the second wireless device 20.

The frame exchange module 14 is operable to exchange MAC addresses, PMNs, and pairing indices with the second wireless device 20 to establish the pairing with the second wireless device 20 upon the condition that the triggering module 11 triggers the pairing. The frame exchange module 14 is further operable to exchange MAC addresses, PMNs, and pairing indices with the second wireless device 20 to establish the unpairing with the second wireless device 20 upon the condition that the triggering module 11 triggers the unpairing.

The first wireless device 10 may further include a pairing determining module 12. The pairing determining module 12 is operable to determine whether a pairing number of the first wireless device 10 exceeds a maximum pairing amount upon the condition that the triggering module 11 triggers the pairing, and abort the pairing upon the condition that the pairing number of the first wireless device 10 exceeds the maximum pairing amount. The pairing determining module 12 is further operable to determine whether the first wireless device 10 has been paired upon the condition that the triggering module 11 triggers the unpairing, and abort the unpairing upon the condition that the first wireless device 10 has not been paired.

The first wireless device 10 may further include a mode selecting module 13. The mode selecting module 13 is operable to select an enrollee mode or a register mode. In one embodiment, a wireless device in the register mode is a device that initiates the pairing/unpairing, and a wireless device in the enrollee mode is a device that joins in the pairing/unpairing. The mode selecting module 13 selects the enrollee mode or the register mode according to whether a wait-pairing frame is received upon the condition that the triggering module 11 triggers the pairing. The mode selecting module 13 selects the enrollee mode or the register mode according to whether a request-unpairing frame is received upon the condition that the triggering module 11 triggers the unpairing.

The first wireless device 10 may further include a storage module 15 is electrically connected to the processor 18 via any known electrical bus 99, and operable to store the MAC address, the PMN, and the pairing index of the second wireless device 20. The storage module 15 may further store computerized commands of the triggering module 11, the frame exchange module 14, the paring module 12, the mode selecting module 13, and the indicating module 16, where the processor 18 further executes computerized commands of the triggering module 11, the frame exchange module 14, the paring module 12, the mode selecting module 13, and the indicating module 16. In this embodiment, the storage module 15 may be a flash memory or another storage device.

The first wireless device 10 may further include an indicating module 16. The indicating module 16 is operable to indicate a pairing status and an unpairing status of the first wireless device 10. In the exemplary embodiment, the indicating module 16 indicates the pairing status and the unpairing status via a user interface, such as a light-emitting diode (LED). In an example, the indicating module 16 flashes during the pairing/unpairing, and lights constantly when the pairing/unpairing is complete. In another example, the indicating module 16 can emit a light of a first color during the pairing/unpairing, and emits a light of a second color when the pairing/unpairing is complete.

The frame exchange module 14 is further operable to exchange pairing information via a wait-pairing frame, a join-pairing frame, and a pairing-accept frame so as to establish the pairing with the second wireless device 20. That is, the frame exchange module 14 uses a 3-way handshake process to exchange the pairing information so as to establish the pairing with the second wireless device 20. The wait-pairing frame is transmitted from a register to an enrollee, so as to notify the enrollee that the register is waiting for the pairing. The join-pairing frame is transmitted from the enrollee to the register, so as to notify the register that the enrollee joins in the pairing. The pairing-accept frame is transmitted from the register to the enrollee, so as to notify the enrollee that the register accepts the pairing of the enrollee.

The frame exchange module 14 is further operable to exchange the pairing information via a request-unpairing frame, a join-unpairing frame, and an unpairing-confirm frame so as to establish unpairing with the second wireless device 20. That is, the frame exchange module 14 uses a 3-way handshake process to exchange the pairing information so as to establish the unpairing with the second wireless device 20. The request-unpairing frame is transmitted from a register to an enrollee, so as to notify the enrollee that the register is requesting for the unpairing. The join-unpairing frame is transmitted from the enrollee to the register, so as to notify the register that the enrollee joins in the unpairing. The unpairing-confirm frame is transmitted from the register to the enrollee, so as to notify the enrollee that the register confirms the unpairing of the enrollee.

In a first example, the triggering module 11 triggers the pairing between the first wireless device 10 and the second wireless device 20, and the mode selecting module 13 selects the enrollee mode. In such a case, the frame exchange module 14 receives a wait-pairing frame from the second wireless device 20, sends a join-pairing frame to the second wireless device 20, and receives a pairing-accept frame from the second wireless device 20, so as to exchange the pairing information to establish the pairing with the second wireless device 20. The wait-pairing frame includes the MAC address and the PMN of the second wireless device 20, so as to notify the first wireless device 10 that the second wireless device 20 is waiting for the pairing. The join-pairing frame includes the MAC address, the PMN, and the pairing index of the first wireless device 10, and the MAC address and the PMN of the second wireless device 20, so as to notify the second wireless device 20 that the first wireless device 10 joins in the pairing. The pairing-accept frame includes the MAC address, the PMN, and the pairing index of the first wireless device 10, and the MAC address, the PMN, and the pairing index of the second wireless device 20, so as to notify that the first wireless device 10 that the second wireless device 20 accepts the pairing of the first wireless device 10.

In a second example, the triggering module 11 triggers the pairing between the first wireless device 10 and the second wireless device 20, and the mode selecting module 13 selects the register mode. In such a case, the frame exchange module 14 broadcasts a wait-pairing frame to the second wireless device 20, receives a join-pairing frame from the second wireless device 20, and sends a pairing-accept frame to the second wireless device 20, so as to exchange the pair information to establish the pairing with the second wireless device 20. The wait-pairing frame includes the MAC address and the PMN of the first wireless device 10, so as to notify the second wireless device 20 that the first wireless device 10 is waiting for the pairing. The join-pairing frame includes the MAC address and the PMN of the first wireless device 10, and the MAC address, the PMN, and the pairing index of the second wireless device 20, so as to notify the first wireless device 10 that the second wireless device 10 joins in the pairing. The pairing-accept frame includes the MAC address, the PMN, and the pairing index of the first wireless device 10, and the MAC address, the PMN, and the pairing index of the second wireless device 20, so as to notify the second wireless device 20 that the first wireless device 10 accepts the pairing of the second wireless device 20.

In a third example, the triggering module 11 triggers the unpairing between the first wireless device 10 and the second wireless device 20, and the mode selecting module 13 selects the enrollee mode. In such a case, the frame exchange module 14 receives a request-unpairing frame from the second wireless device 20, sends a join-unpairing frame to the second wireless device 20, and receives an unpairing-confirm frame from the second wireless device 20, so as to exchange the pairing information to establish the unpairing with the second wireless device 20. The request-unpairing frame includes the MAC address and the PMN of the second wireless device 20, so as to notify the first wireless device 10 that the second wireless device 20 is requesting for the unpairing. The join-unpairing frame includes the MAC address, the PMN, and the pairing index of the first wireless device 10, and the MAC address, the PMN, and the pairing index of the second wireless device 20, so as to notify the second wireless device 20 that the first wireless device 10 joins in the unpairing. The unpairing-confirm frame includes the MAC address, the PMN, and the pairing index of the first wireless device 10, and the MAC address, the PMN, and the pairing index of the second wireless device 20, so as to notify the first wireless device 10 that the second wireless device 20 confirms the unpairing of the first wireless device 10.

In a fourth example, the triggering module 11 triggers the unpairing between the first wireless device 10 and the second wireless device 20, and the mode selecting module 13 selects the register mode. In such a case, the frame exchange module 14 broadcasts a request-unpairing frame to the second wireless device 20, receives a join-unpairing frame from the second wireless device 20, and sends an unpairing-confirm frame to the second wireless device 20, so as to exchange the pairing information to establish the unpairing with the second wireless device 20. The request-unpairing frame includes the MAC address and the PMN of the first wireless device 10, so as to notify the second wireless device 20 that the first wireless device 10 is requesting for the unpairing. The join-unpairing frame includes the MAC address, the PMN, and the pairing index of the first wireless device 10, and the MAC address, the PMN, and the pairing index of the second wireless device 20, so as to notify the first wireless device 10 that the second wireless device 20 joins in the unpairing. The unpairing-confirm frame includes the MAC address, the PMN, and the pairing index of the first wireless device 10, and the MAC address, the PMN, and the pairing index of the second wireless device 20, so as to notify the second wireless device 20 that the first wireless device 10 confirms the unpairing of the second wireless device 20.

In the previous third and fourth examples, the frame exchange module 14 uses active unpairing processes to establish unpairing with the second wireless device 20.

In a fifth example, the frame exchange module 14 is further operable to establish the unpairing with the second wireless device 20 via a passive unpairing process when the triggering module 11 triggers the unpairing between the first wireless device 10 and the second wireless device 20 and the mode selecting module 13 selects the enrollee mode. During the pairing between the first wireless device 10 and the second wireless device 20, the second wireless device 20 in the register mode continuously broadcasts a pairing-information frame. The pairing-information frame includes the MAC address and the PMN of the second wireless device 20. The frame exchange module 14 receives the pairing-information frame from the second wireless device 20, and determines whether the MAC address of the second wireless device 20 is in a pairing list and whether the PMN of the second wireless device 20 has expired. In one embodiment, the pairing list includes MAC addresses of wireless devices which have established pairing with the first wireless device 10. The frame exchange module 14 further cancels the pairing information upon the condition that the MAC address of the second wireless device 20 is in the pairing list and the PMN of the second wireless device 20 has expired.

It should be noted that functional modules of the second wireless device 20 is the same as those of the first wireless device 20.

FIG. 2 is a schematic diagram of one embodiment of a MAC header 100 of a command frame in accordance with the present disclosure. In one embodiment, the command frame includes the wait-pairing frame, the join-pairing frame, the pairing-accept frame, the request-unpairing frame, the join-unpairing frame, and the unpairing-confirm frame.

The MAC header 100 includes a protocol version field 101, a secure field 102, an acknowledgement (ACK) policy field 103, a frame type field 104, a frame subtype field 105, a retry field 106, a destination address field 107, a source address field 108, a sequence control field 109, a duration field 110, a more frames field 111, and an access method field 112.

In one example, the protocol version field 101 is set to 0. The secure field 102 is set to 0 if the first wireless device 10 and second wireless device 20 do not require communication security, and is set to 1 if the first wireless device 10 and the second wireless device 20 require communication security. The ACK policy field 103 is set to 1 if the command frame is a unicast frame, and is set to 0 if the command frame is a broadcast frame. The frame type field 104 is set to 2, indicating the MAC header 100 is a header of a command frame. The frame subtype field 105 is set to 14, indicating the command frame is an application-specific command frame. The retry field 106 is set to 0. The destination address field 107 and the source address field 108 are set to addresses of a recipient and a transmitter, respectively. The sequence control field 109 and the duration field 110 can be set according to the UWB communication protocol. The more frames field 111 and the access method field 112 is set to 0 and 1, respectively. In other examples, the previous fields of the MAC header 100 may be set to other values according to different requirements.

Figure 3:
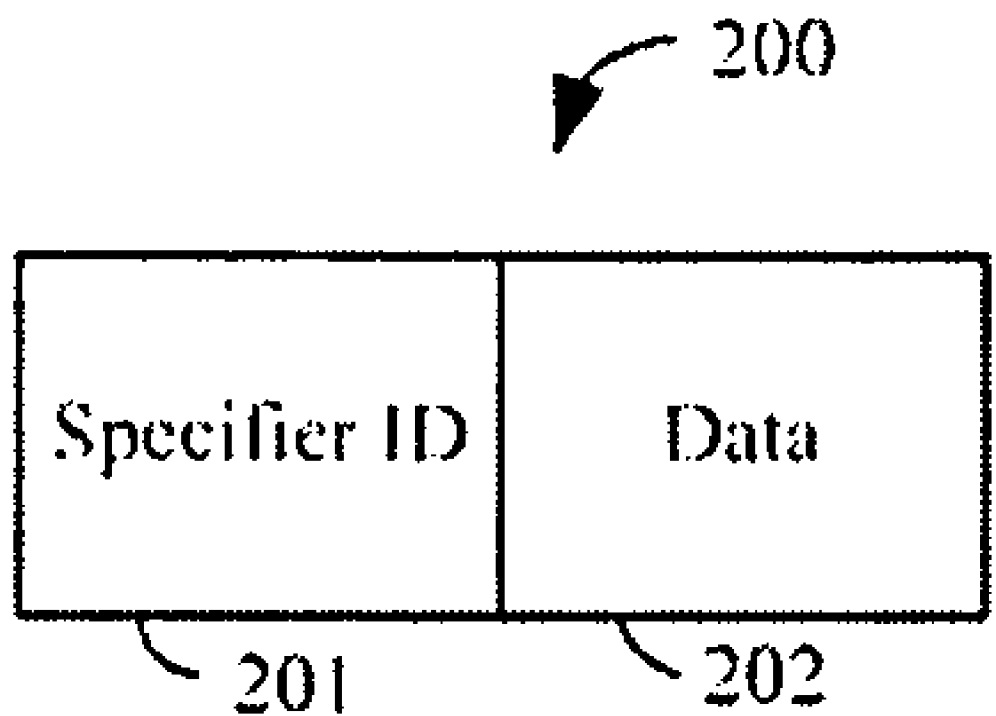
FIG. 3 is a schematic diagram of one embodiment of a payload of a command frame in accordance with the present disclosure.

FIG. 3 is a schematic diagram of a payload 200 of the command frame in accordance with the present disclosure. The MAC header 100 of FIG. 2 and the payload 200 of FIG. 3 cooperatively compose the command frame. The payload 200 includes a specifier identifier (ID) field 201 and a data field 202. The specifier ID field 201 is operable to identify the payload 200. In one example, the specifier ID field 201 can be set to a value that is not used by the UWB protocol, such as 0x1468. The data field 202 includes data loaded by the payload 200, and the detailed description is shown in FIG. 4.

Figure 4:
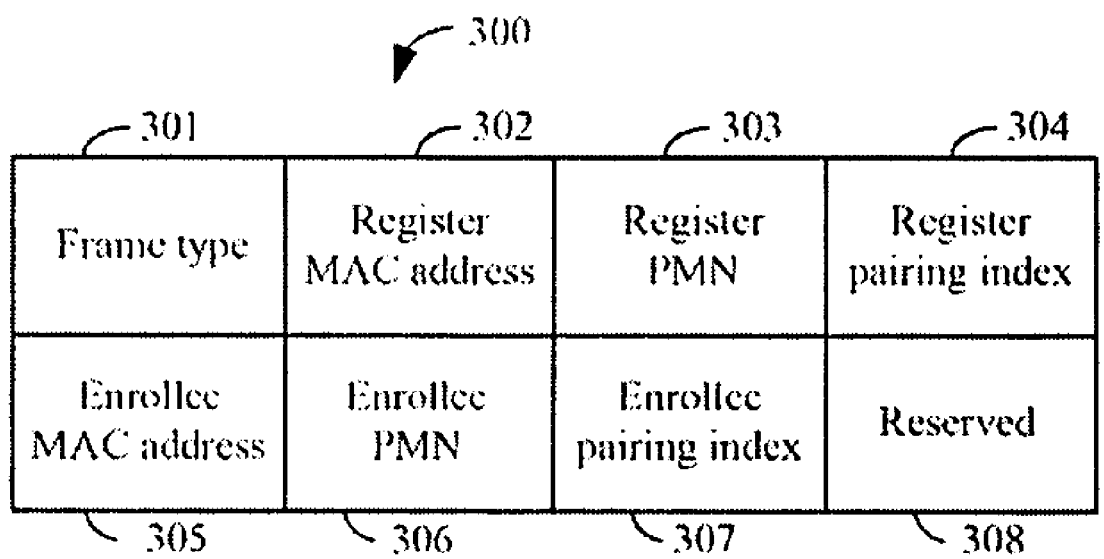
FIG. 4 is a schematic diagram of one embodiment of detailed data of a command frame in accordance with the present disclosure.

A detailed data 300 of FIG. 4 is one example of the data field 202 of FIG. 3. The detailed data 300 includes fields of a frame type 301, a register MAC address 302, a register PMN 303, a register pairing index 304, an enrollee MAC address 305, an enrollee PMN 306, an enrollee pairing index 307, and a reserved field 308. The frame type 301 indicates a frame with the detailed data 300 is a wait-pairing frame, a join-pairing frame, a pairing-accept frame, a request-unpairing frame, a join-unpairing frame, or an unpairing-confirm frame. The reserved field 308 is a field reserved for future usage. In one embodiment, the reserved field 308 is meaningless, which can be set to 0. The other fields of the detailed data 300 will be described in the following pairing/unpairing methods hereinafter.

Figure 5:
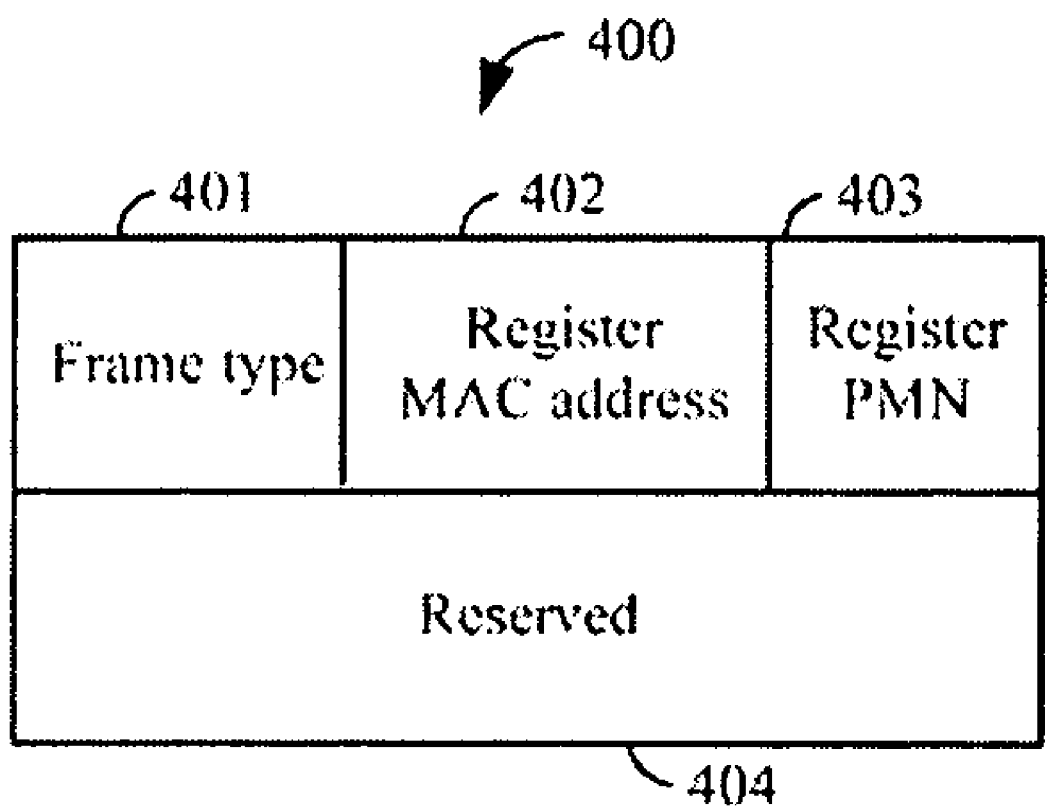
FIG. 5 is a schematic diagram of one embodiment of a pairing-information frame in accordance with the present disclosure.

FIG. 5 is a schematic diagram of one embodiment of a pairing-information frame 400 in accordance with the present disclosure. During the pairing between the first wireless device 10 and the second wireless device 20, a wireless device (the first wireless device 10 or the second wireless device 20) in a register mode continuously broadcasts the pairing-information frame 400. The pairing information frame 400 includes a frame type 401, a register MAC address 402, a register PMN 403, and a reserved field 404. The frame type 401 identifies a type of the pairing-information frame 400. The register MAC address 402 and the register PMN 403 are set to a MAC address and a PMN of the wireless device in the register mode, respectively. The reserved field 404 is a field reserved for further usage.

Figure 6:
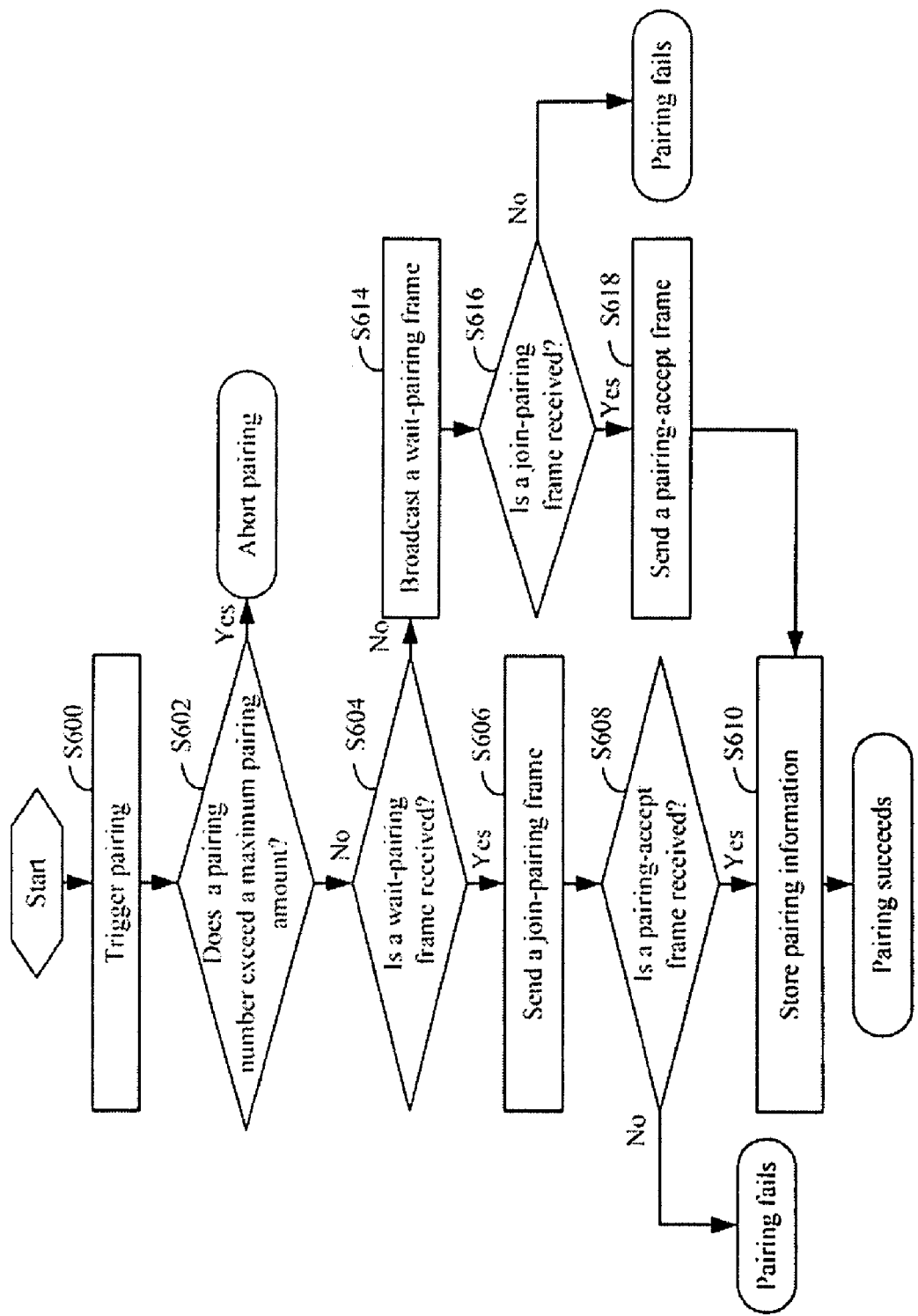
FIG. 6 is a flowchart of one embodiment of a pairing method in accordance with the present disclosure.

FIG. 6 is a flowchart of one embodiment of a pairing method in accordance with the present disclosure. In one embodiment, the pairing method is executed by the functional modules of FIG. 1. Depending on the embodiment, additional blocks may be added, others deleted, and the ordering of the blocks may be changed.

In block S600, the first wireless device 10 triggers pairing between the first wireless device 10 and the second wireless device 20.

In block S602, the first wireless device 10 determines whether a pairing number of the first wireless device 10 exceeds a maximum pairing amount.

If the pairing number of the first wireless device 10 exceeds the maximum pairing amount, the pairing between the first wireless device 10 and the second wireless device 20 aborts.

If the pairing number of the first wireless device 10 does not exceed the maximum pairing amount, the first wireless device 10 determines whether a wait-pairing frame is received within a first predetermined time period as shown in block S604.

If the wait-pairing frame is received within the first predetermined time period, the first wireless device 10 enters an enrollee mode, and then sends a join-pairing frame to the second wireless device 20 as shown in block S606.

In block S608, the first wireless device 10 determines whether a pairing-accept frame is received within a second predetermined time period.

If the pairing-accept is not received within the second predetermined time period, the pairing between the first wireless device 10 and the second wireless device 20 fails.

If the pairing-accept frame is received within the second predetermined time period, the first wireless device 10 stores pairing information as shown in block S610. The paring information includes a MAC addresses, a pairing magic number (PMN), and a pairing index of the second wireless device 20. Thus, the first wireless device 10 has successfully established the pairing with the second wireless device 20.

If the wait-pairing frame is not received within the first determined time period in block S604, the first wireless device 10 enters a register mode, and then broadcasts a wait-pairing frame to the second wireless device 20 as shown in block S614.

In block S616, the first wireless device 10 determines whether a join-pairing frame is received within a third predetermined time period.

If the join-pairing frame is not received within the third predetermined time period, the pairing between the first wireless device 10 and the second wireless device 20 fails.

If the join-pairing frame is received within the third predetermined time period, the first wireless device 10 sends a pairing-accept frame to the second wireless device 20 as shown in block S618.

In block S610, the first wireless device 10 stores the pairing information. Thus, the first wireless device 10 has successfully established the pairing with the second wireless device 20.

Figure 7:
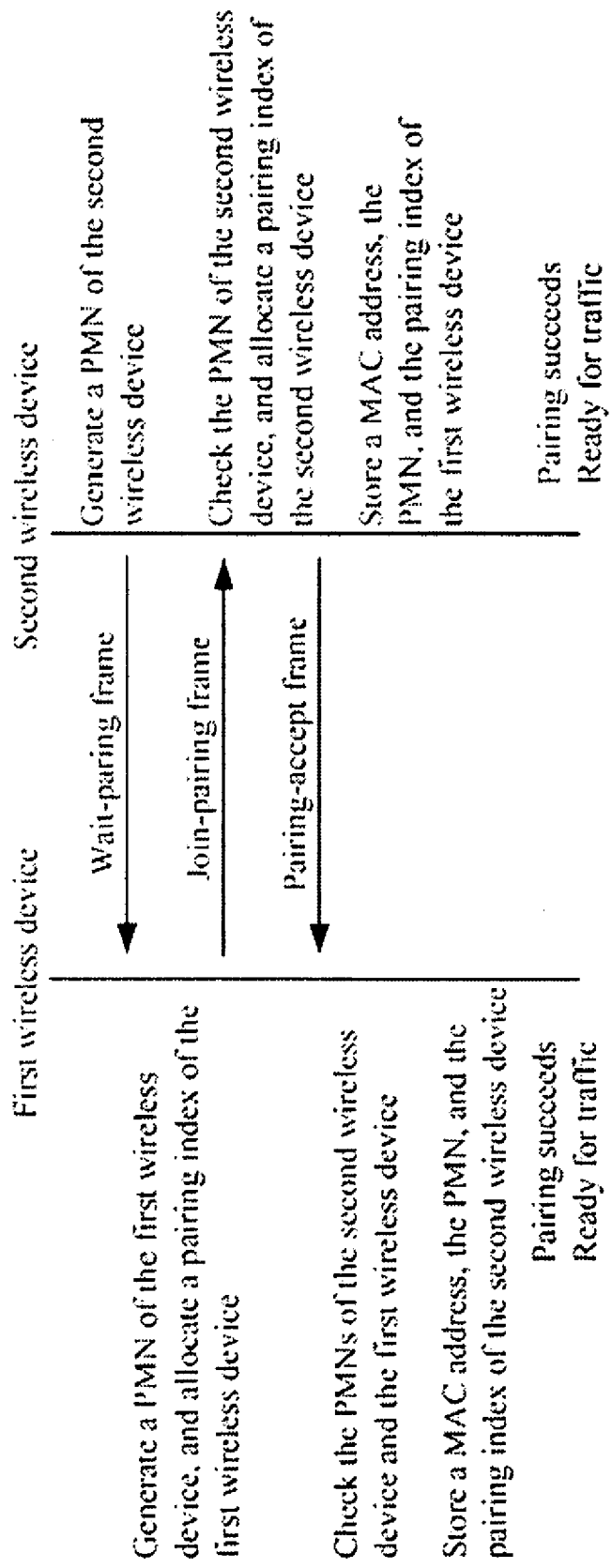
FIG. 7 is a transport diagram of one embodiment of a pairing method in accordance with the present disclosure.

FIG. 7 is a transport diagram of one embodiment of a pairing method in accordance with the present disclosure. In this embodiment, the first wireless device 10 exchanges pairing information with the second wireless device 20 via a wait-pairing frame, a join-pairing frame, and a pairing-accept frame so as to establish the pairing with the second wireless device 20. The first wireless device 10 enters an enrollee mode, while the second wireless device 20 enters a register mode.

Initially, the second wireless device 20 generates a PMN of the second wireless device 20, and then broadcasts a wait-pairing frame to the first wireless device 10. In one embodiment, the wait-pairing frame includes the PMN and a MAC address of the second wireless device 20, so as to notify the first wireless device 10 that the second wireless device 20 is waiting for the pairing. Please referring to FIG. 4, with regard to the detailed data 300 of the wait-pairing frame, the register MAC address 302 and the register PMN 303 are set to the MAC address and the PMN of the second wireless device 20, respectively. The register pairing index 304, the enrollee MAC address 305, the enrollee PMN 306, and the enrollee pairing index 307 are meaningless, which can be set to 0, 0x0, 0x0, and 0, respectively.

Afterwards, the first wireless device 10 receives the wait-pairing frame from the second wireless device 20. The first wireless device 10 then generates a PMN of the first wireless device 10, allocates a pairing index of the first wireless device 10, and sends a join-pairing frame to the second wireless device 20. In one embodiment, the join-pairing frame includes the MAC address, the PMN, and the pairing index of the first wireless device 10, and the MAC address and the PMN of the second wireless device 20. Please referring to FIG. 4, with regard to the detailed data 300 of the join-pairing frame, the enrollee MAC address 305, the enrollee PMN 306, and the enrollee pairing index 307 are set to the MAC address, the PMN, and the pairing index of the first wireless device 10, respectively. The register MAC address 302 and the register PMN 303 are set to the MAC address and the PMN of the second wireless device 20, respectively. The register pairing index 304 is meaningless, which can be set to 0.

Afterwards, the second wireless device 20 receives the join-pairing frame from the first wireless device 10, and checks whether the PMN of the second wireless device 20 is valid. If the PMN of the second wireless device 20 is valid, the second wireless device 20 allocates a pairing index of the second wireless device 20, and sends a pairing-accept frame to the first wireless device 10. In one embodiment, the pairing-accept frame includes the MAC address, the PMN, and the pairing index of the first wireless device 10, and the MAC address, the PMN, and the pairing index of the second wireless device 20. Referring to FIG. 4, with regard to the detailed data 300 of the pairing-accept frame, the register MAC address 302, the register PMN 303, and the register pairing index 304 are set to the MAC address, the PMN, and the pairing index of the second wireless device 20, respectively. The enrollee MAC address 305, the enrollee PMN 306, and the enrollee pairing index 307 are set to the MAC address, the enrollee PMN, and the pairing index of the first wireless device 10, respectively.

Simultaneously, the second wireless device 20 stores the MAC address, the PMN, and the pairing index of the first wireless device 10. In one embodiment, the second wireless device 20 stores the MAC address, the PMN, and the pairing index of the first wireless device 10 in a flash memory.

Finally, the first wireless device 10 receives the pairing-accept frame, and checks whether the PMNs of the first wireless device 10 and the second wireless device 20 are valid. If the PMNs are valid, the first wireless device 10 stores the MAC address, the PMN, and the pairing index of the second wireless device 20. In one embodiment, the first wireless device 10 stores the MAC address, the PMN, and the pairing index of the second wireless device 20 in a flash memory.

Thus, the pairing between the first wireless device 10 and the second wireless device 20 succeeds, and the first wireless device 10 and the second wireless device 20 are ready for traffic.

Figure 8:
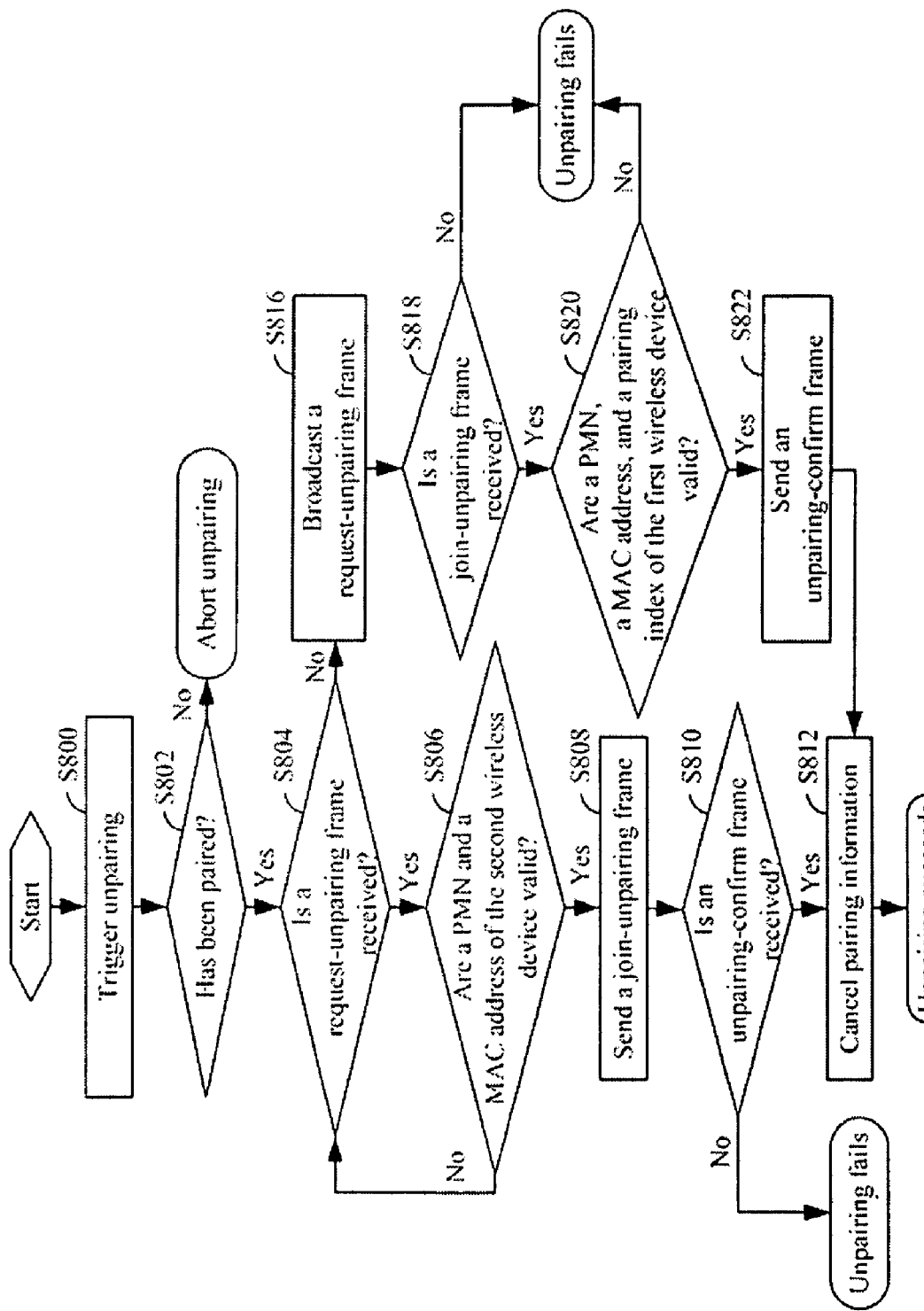
FIG. 8 is a flowchart of one embodiment of an unpairing method in accordance with the present disclosure.

FIG. 8 is a flowchart of one embodiment of an unpairing method in accordance with the present disclosure. In this embodiment, the unpairing method is executed by the functional modules of FIG. 1. Depending on the embodiment, additional blocks may be added, others deleted, and the ordering of the blocks may be changed.

In block S800, the first wireless device 10 triggers unpairing between the first wireless device 10 and the second wireless device 20.

In block S802, the first wireless device 10 determines whether the first wireless device 10 has been paired.

If the first wireless device 10 has not been paired, the unpairing between the first wireless device 10 and the second wireless device 20 aborts.

If the first wireless device 10 has been paired, the first wireless device 10 determines whether a request-unpairing frame is received within a fourth predetermined time period as shown in block S804.

If the request-unpairing frame is received within the fourth predetermined time period, the first wireless device 10 enters an enrollee mode, and then determines whether a MAC address and a PMN of the second wireless device 20 are valid as shown in block S806.

If the MAC address and the PMN of the second wireless device 20 are valid, the first wireless device 10 sends a join-unpairing frame to the second wireless device 20 as shown in block S808.

In block S810, the first wireless device 10 determines whether an unpairing-confirm frame is received within a fifth predetermined time period. If the unpairing-confirm is not received within the fifth predetermined time period, the unpairing between the first wireless device 10 and the second wireless device 20 fails.

If the unpairing-confirm is received within the fifth predetermined time period, the first wireless device 10 cancels pairing information as shown in block S812. The paring information includes a MAC address, a pairing magic number (PMN), and a pairing index of the second wireless device 20. Thus, the first wireless device 10 has successfully established the unpairing with the second wireless device 20.

If the request-unpairing frame is not received within the fourth determined time period in block S804, the first wireless device 10 enters a register mode, and then broadcasts a request-unpairing frame to the second wireless device 20 as shown in block S816.

In block S818, the first wireless device 10 determines whether a join-unpairing frame is received with a sixth predetermined time period.

If the join-unpairing is not received within the sixth predetermined time period, the unpairing between the first wireless device 10 and the second wireless device 20 fails.

If the join-unpairing is received within the sixth predetermined time period, in block S820, the first wireless device 10 determines whether a PMN, a MAC address, and a pairing index of the first wireless device 10 are valid.

If the PMN, the MAC address, and the pairing index of the first wireless device 10 are not valid, the unpairing between the first wireless device 10 and the second wireless device 20 fails.

If the PMN, the MAC address, and the pairing index of the first wireless device 10 are valid, the first wireless device 10 sends an unpairing-confirm frame to the second wireless device 20 as shown in block S822.

In block S812, the first wireless device 10 cancels the pairing information. Thus, the first wireless device 10 has successfully established the unpairing with the second wireless device 20.

Figure 9:
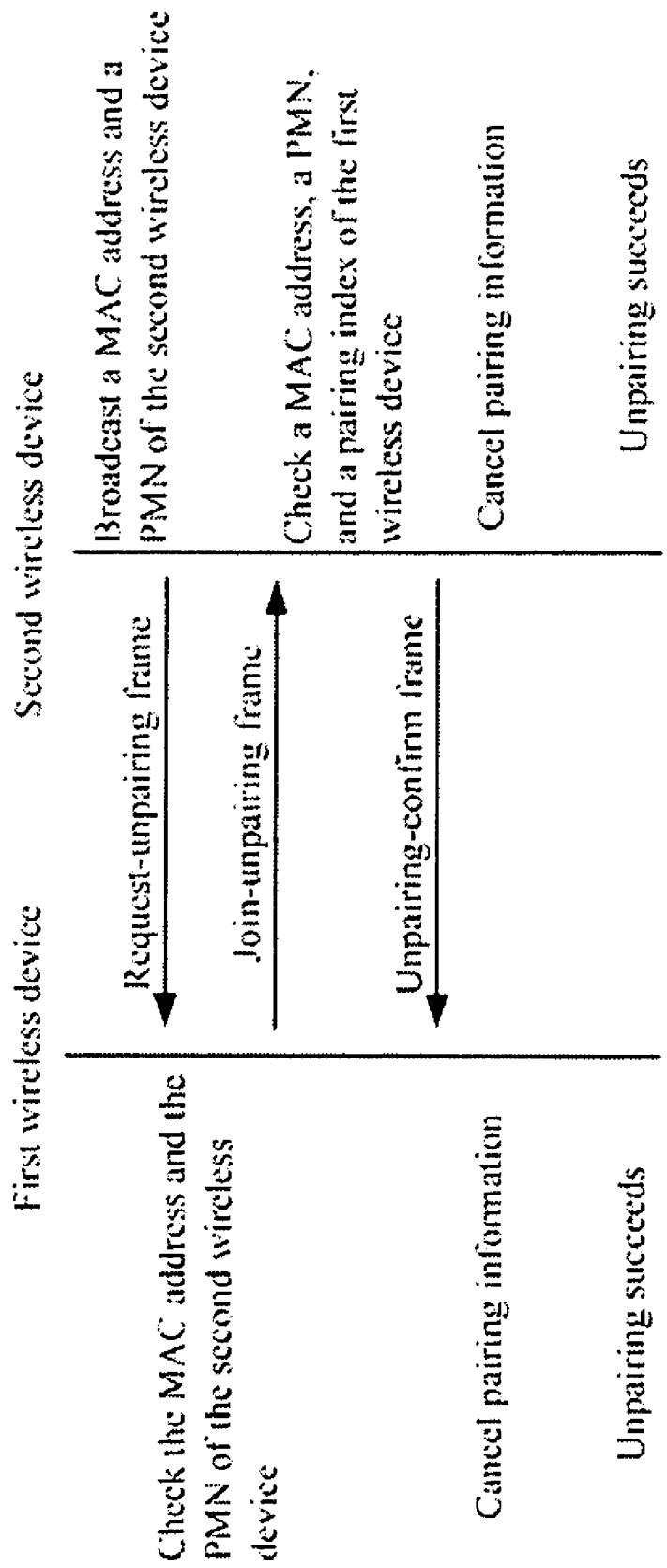
FIG. 9 is a transport diagram of one embodiment of an unpairing method in accordance with the present disclosure.

FIG. 9 is a transport diagram of one embodiment of an unpairing method in accordance with the present disclosure. In this embodiment, the first wireless device 10 exchanges pairing information with the second wireless device 20 via a request-unpairing frame, a join-unpairing frame, and an unpairing-confirm frame so as to establish unpairing with the second wireless device 20. The first wireless device 10 enters an enrollee mode, while the second wireless device 20 enters a register mode.

Initially, the second wireless device 20 broadcasts a request-unpairing frame to the first wireless device 10. In one embodiment, the request-unpairing frame includes a PMN and a MAC address of the second wireless device 20, so as to notify the first wireless device 10 that the second wireless device 20 is requesting for the unpairing. Please referring to FIG. 4, with regard to the detailed data 300 of the request-unpairing frame, the register MAC address 302 and the register PMN 303 are set to the MAC address and the PMN of the second wireless device 20, respectively. The register pairing index 304, the enrollee MAC address 305, the enrollee PMN 306, and the enrollee pairing index 307 are meaningless, which can be set to 0, 0x0, 0x0, and 0, respectively.

Afterwards, the first wireless device 10 receives the request-unpairing frame, and checks whether the PMN and the MAC address of the second wireless device 20 are valid. If the PMN and the MAC address of the second wireless device 20 are valid, the first wireless device 10 sends a join-unpairing frame to the second wireless device 20. In one embodiment, the join-unpairing frame includes the MAC address, the PMN, and the pairing index of the first wireless device 10, and the MAC address, the PMN, and the pairing index of the second wireless device 20, so as to notify the second wireless device 20 that the first wireless device 10 joins in the unpairing. Please referring to FIG. 4, regarding the detailed data 300 of the join-unpairing frame, the enrollee MAC address 305, the enrollee PMN 306, and the enrollee pairing index 307 are set to the MAC address, the PMN, and the pairing index of the first wireless device 10, respectively. The register MAC address 302, the register PMN 303, and the register pairing index 304 are set to the MAC address, the PMN, and the pairing index of the second wireless device 20, respectively.

Afterwards, the second wireless device 20 receives the join-unpairing frame, and checks whether the MAC address, the PMN, and the pairing index of the first wireless device 10 are valid. If the MAC address, the PMN, and the pairing index of the first wireless device 10 are valid, the second wireless device 20 sends an unpairing-confirm frame to the first wireless device 10. In one embodiment, the unpairing-confirm frame includes the MAC address, the PMN, and the pairing index of the first wireless device 10, and the MAC address, the PMN, and the pairing index of the second wireless device 20. Referring to FIG. 4, with regard to the detailed data 300 of the unpairing-confirm frame, the register MAC address 302, the register PMN 303, and the register pairing index 304 are set to the MAC address, the PMN, and the pairing index of the second wireless device 20, respectively. The enrollee MAC address 305, the enrollee PMN 306, and the enrollee pairing index 307 are set to the MAC address, the enrollee PMN, and the pairing index of the first wireless device 10, respectively.

Simultaneously, the second wireless device 20 cancels the pairing information. In one embodiment, the second wireless device 20 erases the pairing information in a flash memory.

Finally, the first wireless device 10 receives the unpairing-confirm frame, and cancels the pairing information. In one embodiment, the first wireless device 10 erases the pairing information in a flash memory.

Thus, the unpairing between the first wireless device 10 and the second wireless device 20 succeeds.

Figure 10:
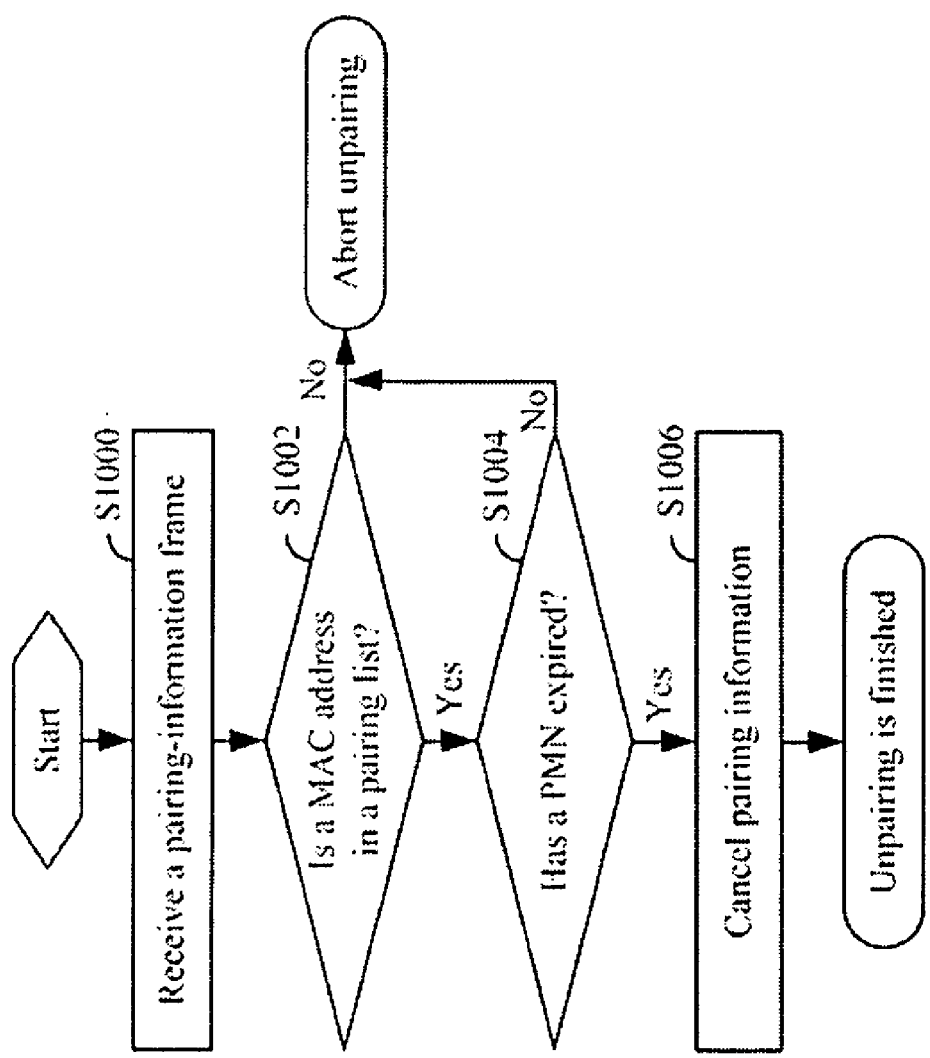
FIG. 10 is a flowchart of one embodiment of an unpairing method in accordance with the present disclosure.

FIG. 10 is a flowchart of another embodiment of an unpairing method in accordance with the present disclosure. In this embodiment, the unpairing method is executed by the functional modules of FIG. 1. Depending on the embodiment, additional blocks may be added, others deleted, and the ordering of the blocks may be changed.

In one embodiment, the first wireless device 10 establishes unpairing with the second wireless device 20 via a passive unpairing process. During the pairing between the first wireless device 10 and the second wireless device 20, the second wireless device 20 in a register mode continuously broadcasts a pairing-information frame. The pairing-information frame includes a MAC address and a PMN of the second wireless device 20.

In block S1000, the first wireless device 10 receives the pairing-information frame from the second wireless device 20.

In block S1002, the first wireless device 10 determines whether the MAC address of the second wireless device 20 is in a pairing list. In one embodiment, the pairing list includes MAC addresses of wireless devices that have established pairing with the first wireless device 10.

If the MAC address of the second wireless device 20 is not in the pairing list, the unpairing between the first wireless device 10 and the second wireless device 20 aborts.

If the MAC address of the second wireless device 20 is in the pairing list, the first wireless device 10 determines whether the PMN of the second wireless device 10 has expired.

If the PMN of the second wireless device 20 has not expired, the unpairing between the first wireless device 10 and the second wireless device 20 aborts.

If the PMN of the second wireless device 20 has expired, the pairing information has also expired. In such a case, the first wireless device 20 cancels the pairing information as shown in block S1006. Thus, the first wireless device 10 has successfully established the unpairing with the second wireless device 20.

Therefore, the first wireless device 10 can exchange the MAC addresses, the PMNs, and the pairing indices with the second wireless device 20 so as to establish wireless pairing/unpairing with the second wireless device 20, which is cost-effective and convenient for end users.

While various embodiments and methods of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. A wireless device comprising:
a processor;
a storage module electrically connected to the processor, and
one or more programs, wherein the one or more programs are stored in the storage module and executed by the processor, comprising:
a triggering module operable to trigger pairing or un-pairing between the wireless device and another wireless device; and
a frame exchange module operable to exchange media access control (MAC) addresses, pairing magic numbers, and pairing indices with the another wireless device so as to establish the pairing with the another wireless device upon the condition that the triggering module triggers the pairing, and operable to exchange the MAC addresses, the pairing magic numbers, and the pairing indices with the another wireless device to so as to establish the unpairing with the another wireless device upon the condition that the triggering module triggers the un-pairing;
wherein the pairing magic numbers are operable to identify the pairing between the wireless device and the another wireless device, and the pairing indices are operable to launch the MAC addresses, the pairing magic numbers, and the pairing indices.

2. The wireless device of claim 1, wherein the one or more programs further comprise a mode selecting module operable to select a mode from an enrollee mode and a register mode, wherein the storage module further stores the MAC address, the pairing magic number, and the pairing index of the another wireless device.

3. The wireless device of claim 2, wherein the frame exchange module is further operable to receive a wait-pairing frame from the another wireless device, send a join-pairing frame to the another wireless device, and receive a pairing-accept frame from the another wireless device, so as to exchange the MAC addresses, the pairing magic numbers, and the pairing indices with the another wireless device, upon the condition that the triggering module triggers the pairing and the mode selecting module selects the enrollee mode.

4. The wireless device of claim 3, wherein:
the wait-pairing frame comprises the MAC address and the pairing magic number of the another wireless device, so as to notify the wireless device that the another wireless device is waiting for the pairing;
the join-pairing frame comprises the MAC address, the pairing magic number, and the pairing index of the wireless device, and the MAC address and the pairing magic number of the another wireless device, so as to notify the another wireless device that the wireless device joins in the pairing; and
the pairing-accept frame comprises the MAC address, the pairing magic number, and the pairing index of the wireless device, and the MAC address, the pairing magic number, and the pairing index of the another wireless device, so as to notify that the wireless device that the another wireless device accepts the pairing of the wireless device.

5. The wireless device of claim 2, wherein the frame exchange module is further operable to broadcast a wait-pairing frame to the another wireless device, receive a join-pairing frame from the another wireless device, and send a pairing-accept frame to the another wireless device, so as to exchange the MAC addresses, the pairing magic numbers, and the pairing indices with the another wireless device, upon the condition that the triggering module triggers the pairing and the mode selecting module selects the register mode.

6. The wireless device of claim 5, wherein:
the wait-pairing frame comprises the MAC address and the pairing magic number of the wireless device, so as to notify the another wireless device that the wireless device is waiting for the pairing;
the join-pairing frame comprises the MAC address and the pairing index of the wireless device, and the MAC address, the pairing magic number, and the pairing index of the another wireless device, so as to notify the wireless device that the another wireless device joins in the pairing; and
the pairing-accept frame comprises the MAC address, the pairing magic number, and the pairing index of the wireless device, and the MAC address, the pairing magic number, and the pairing index of the another wireless device, so as to notify the another wireless device that the wireless device accepts the pairing of the another wireless device.

7. The wireless device of claim 2, wherein the frame exchange module is further operable to receive a request-unpairing frame from the another wireless device, send a join-unpairing frame to the another wireless device, and receive an unpairing-confirm frame from the another wireless device, so as to exchange the MAC addresses, the pairing magic numbers, and the pairing indices with the another wireless device, upon the condition that the triggering module triggers the unpairing and the mode selecting module selects the enrollee mode.

8. The wireless device of claim 7, wherein:
the request-unpairing frame comprises the MAC address and the pairing magic number of the another wireless device, so as to notify the wireless device that the another wireless device is requesting for the unpairing;
the join-unpairing frame comprises the MAC address, the pairing magic number, and the pairing index of the wireless device, and the MAC address, the pairing magic number, and the pairing index of the another wireless device, so as to notify the another wireless device that the wireless device joins in the unpairing; and the unpairing-confirm frame comprises the MAC address, the pairing magic number, and the pairing index of the wireless device, and the MAC address, the pairing magic number, and the pairing index of the another wireless device, so as to notify the wireless device that the another wireless device confirms the unpairing of the wireless device.

9. The wireless device of claim 2, wherein the frame exchange module is further operable to broadcast a request-unpairing frame to the another wireless device, receive a join-unpairing frame from the another wireless device, and send an unpairing-confirm frame to the another wireless device, so as to exchange the MAC addresses, the pairing magic numbers, and the pairing indices with the another wireless device, upon the condition that the triggering module triggers the unpairing and the mode selecting module selects the register mode.

10. The wireless device of claim 9, wherein:
the request-unpairing frame comprises the MAC address and the pairing magic number of the wireless device, so as to notify the another wireless device that the wireless device is requesting for the unpairing;
the join-unpairing frame comprises the MAC address, the pairing magic number, and the pairing index of the wireless device, and the MAC address, the pairing magic number, and the pairing index of the another wireless device, so as to notify the wireless device that the another wireless device joins in the unpairing; and
the unpairing-confirm frame comprises the MAC address, the pairing magic number, and the pairing index of the wireless device, and the MAC address, the pairing magic number, and the pairing index of the another wireless device, so as to notify the another wireless device that the wireless device confirms the unpairing of the another wireless device.

11. The wireless device of claim 1, wherein the frame exchange module is operable to receive a pairing-information frame comprising the MAC address and the pairing magic number of the another wireless device from the another wireless device, determine whether the MAC address of the another wireless device is in a pairing list and whether the pairing magic number of the another wireless device has expired, and cancel the MAC address, the pairing magic number, and the pairing index of the another wireless device upon the condition that the MAC address of the another wireless device is in the pairing list and the pairing magic number of the another wireless device has expired.

12. The wireless device of claim 1, further comprising:
a pairing determining module operable to determine whether a pairing number of the wireless device exceeds a maximum pairing amount upon the condition that the triggering module triggers the pairing, and abort the pairing upon the condition that the pairing number of the wireless device exceeds the maximum pairing amount, and operable to determine whether the wireless device has been paired upon the condition that the triggering module triggers the unpairing, and abort the unpairing upon the condition that the wireless device has not been paired; and
an indicating module operable to indicate a pairing status and an unpairing status of the wireless device.

13. A pairing method for establishing pairing between a first wireless device and a second wireless device, the pairing method comprising:
triggering pairing between the first wireless device and the second wireless device and entering a register mode by the second wireless device;
triggering pairing between the first wireless device and the second wireless device and entering an enrollee mode by the first wireless device; and
exchanging media access control (MAC) addresses, pairing magic numbers, and pairing indices between the first wireless device and the second wireless device to establish the pairing between the first wireless device and the second wireless device, wherein the pairing magic numbers are operable to identify the pairing between the first wireless device and the second wireless device, and the pairing indices are operable to launch the MAC addresses, the pairing magic numbers, and the pairing indices.

14. The pairing method of claim 13, further comprising:
determining whether a pairing number of the first wireless device exceeds a maximum pairing amount;
aborting the pairing between the first wireless device and the second wireless device if the pairing number exceeds the maximum pairing amount; or
continuing the pairing between the first wireless device and the second wireless device if the pairing number does not exceed the maximum pairing amount.

15. The pairing method of claim 13, wherein the exchanging step comprises:
generating the pairing magic number of the second wireless device by the second wireless device;
broadcasting a wait-pairing frame from the second wireless device to the first wireless device, wherein the wait-pairing frame comprises the MAC address and the pairing magic number of the second wireless device, so as to notify the first wireless device that the second wireless device is waiting for the pairing;
receiving the wait-pairing frame by the first wireless device;
generating the pairing magic number of the first wireless device and allocating the pairing index of the first wireless device by the first wireless device;
sending a join-pairing frame from the first wireless device to the second wireless device, wherein the join-pairing frame comprises the MAC address, the pairing magic number, and the pairing index of the first wireless device, and the MAC address and the pairing magic number of the second wireless device, so as to notify the second wireless device that the first wireless device joins in the pairing;
receiving the join-pairing frame and checking whether the pairing magic number of the second wireless device is valid by the second wireless device;
allocating the pairing index of the second wireless device by the second wireless device if the pairing magic number of the second wireless device is valid;
sending a pairing-accept frame from the second wireless device to the first wireless device, wherein the pairing-accept frame comprises the MAC address, the pairing magic number, and the pairing index of the first wireless device, and the MAC address, the pairing magic number, and the pairing index of the second wireless device, so as to notify the first wireless device that the second wireless device accepts the pairing of the first wireless device;

storing the MAC address, the pairing magic number, and the pairing index of the first wireless device by the second wireless device; and receiving the pairing-accept frame and storing the MAC address, the pairing magic number, and the pairing index of the second wireless device by the first wireless device.

16. The pairing method of claim 13, further comprising:
exchanging the MAC addresses, the pairing magic numbers, and the pairing indices between the first wireless device and the second wireless device to establish unpairing between the first wireless device and the second wireless device;

canceling the MAC address, the pairing magic number, the pairing index of the first wireless device by the second wireless device; and canceling the MAC address, the pairing magic number, the pairing index of the second wireless device by the first wireless device.

17. The pairing method of claim 13, further comprising:
broadcasting a pairing-information frame by the second wireless device, wherein the pairing-information frame comprises the MAC address and the pairing magic number of the second wireless device;

receiving the pairing-information frame and determining whether the MAC address of the second wireless device is in a pairing list by the first wireless device;

determining whether the pairing magic number of the second wireless device has expired by the first wireless device, if the MAC address of the second wireless device is in the pairing list; and canceling the MAC address, the pairing magic number, and the pairing index of the second wireless device by the first wireless device, if the pairing magic number of the second wireless device has expired.

18. An unpairing method for establishing unpairing between a first wireless device and a second wireless device comprising:
triggering unpairing between the first wireless device and the second wireless device and entering a register mode by the second wireless device;

triggering unpairing between the first wireless device and the second wireless device and entering an enrollee mode by the first wireless device; and exchanging media access control (MAC) addresses, pairing magic numbers, and pairing indices between the first wireless device and the second wireless device to establish the unpairing between the first wireless device and the second wireless device, wherein the pairing magic numbers are operable to identify the pairing between the first wireless device and the second wireless device, and the pairing indices are operable to launch the MAC addresses, the pairing magic numbers, and the pairing indices.

19. The unpairing method of claim 18, further comprising:
determining whether the first wireless device has been paired by the first wireless device;

aborting the unpairing between the first wireless device and the second wireless device if the first wireless device has not been paired; or continuing the unpairing between the first wireless device and the second wireless device if the first wireless device has been paired.

20. The unpairing method of claim 18, the exchanging step comprises:
broadcasting a request-unpairing frame from the second wireless device to the first wireless device, wherein the request-unpairing frame comprises the MAC address and the pairing magic number of the second wireless device, so as to notify the first wireless device that the second wireless device is requesting for the unpairing;

receiving the request-unpairing frame by the first wireless device;

checking the MAC address and the pairing magic number of the second wireless device is valid;

sending a join-unpairing frame from the first wireless device to the second wireless device if the MAC address and the pairing magic number of the second wireless device is valid, wherein the join-unpairing frame comprises the MAC address, the pairing magic number, and the pairing index of the first wireless device, and the MAC address, the pairing magic number, and the pairing index of the second wireless device, so as to notify the second wireless device that the first wireless device joins in the unpairing;

receiving the join-unpairing frame and checking whether the MAC address, the pairing magic number, and the pairing index of the first wireless device is valid by the second wireless device;

sending an unpairing-confirm frame from the second wireless device to the first wireless device, if the MAC address, the pairing magic number, and the pairing index of the first wireless device is valid, wherein the unpairing-confirm frame comprises the MAC address, the pairing magic number, and the pairing index of the first wireless device, and the MAC address, the pairing magic number, and the pairing index of the second wireless device, so as to notify the first wireless device that the second wireless device confirms the unpairing of the first wireless device;

canceling the MAC address, the pairing magic number, and the pairing index of the first wireless device by the second wireless device;

receiving the unpairing-confirm frame by the first wireless device; and canceling the MAC address, the pairing magic number, and the pairing index of the second wireless device by the first wireless device.

* * * * *